US012646015B2

(12) United States Patent
Boxell et al.

(10) Patent No.: US 12,646,015 B2
(45) Date of Patent: Jun. 2, 2026

(54) PROPENSITY PERTURBATION FOR MODELED TREATMENT SELECTION

(71) Applicant: Maplebear Inc., San Francisco, CA (US)

(72) Inventors: Levi Boxell, Brownsburg, IN (US); Rustin Partow, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 206 days.

(21) Appl. No.: 18/238,330

(22) Filed: Aug. 25, 2023

(65) Prior Publication Data

US 2025/0068988 A1 Feb. 27, 2025

(51) Int. Cl.
| | |
|---|---|
| *G06Q 20/32* | (2012.01) |
| *G06F 9/451* | (2018.01) |
| *G06F 16/23* | (2019.01) |
| *G06F 21/53* | (2013.01) |
| *G06F 40/221* | (2020.01) |
| *G06F 40/30* | (2020.01) |
| *G06Q 10/04* | (2023.01) |
| *G06Q 20/04* | (2012.01) |
| *G06Q 20/10* | (2012.01) |
| *G06Q 20/30* | (2012.01) |
| *G06Q 20/34* | (2012.01) |
| *G06Q 20/36* | (2012.01) |

(Continued)

(52) U.S. Cl.
CPC .................................... *G06Q 10/04* (2013.01)

(58) Field of Classification Search
CPC ............................. G06Q 10/04; G06Q 20/405
See application file for complete search history.

(56) References Cited

U.S. PATENT DOCUMENTS

| | | | |
|---|---|---|---|
| 10,580,035 B2 * | 3/2020 | Mehanian .......... | G06Q 30/0269 |
| 11,861,538 B1 * | 1/2024 | Ye ...................... | G06Q 10/0637 |

(Continued)

OTHER PUBLICATIONS

N. Radcliffe, "Generating Incremental Sales," 2007, Stochastic Solutions Ltd., retrieved from: https://stochasticsolutions.com/pdf/CrossSell.pdf (Year: 2007).*

(Continued)

*Primary Examiner* — Jessica Lemieux
*Assistant Examiner* — Douglas W Pinsky
(74) *Attorney, Agent, or Firm* — Fenwick & West LLP

(57) ABSTRACT

A computing system automatically selects treatments for users by generating a propensity vector for a set of treatments and selecting a treatment based on the propensity vector. The propensity vector is determined based on one or more computer models that predict user actions responsive to the treatments and the propensity vector is determined based on the value of a treatment parameter. The treatment parameter is perturbed to determine an adjusted propensity vector. Treatments are applied and outcomes determined with the propensities determined by the current value of the treatment parameter, and counterfactuals for the adjusted treatment vector are determined to evaluate the effect of modifying the treatment parameter. When the perturbed treatment parameter value yields improved results in the counterfactual, the current value is modified to improve performance of the model as a whole without requiring retraining of underlying predictive models.

20 Claims, 6 Drawing Sheets

(51) Int. Cl.

| | |
|---|---|
| *G06Q 20/38* | (2012.01) |
| *G06Q 20/40* | (2012.01) |
| *G06Q 40/06* | (2012.01) |
| *G06T 7/10* | (2017.01) |
| *H04L 9/32* | (2006.01) |
| *H04L 29/06* | (2006.01) |
| *H04W 12/06* | (2021.01) |
| *H04W 12/08* | (2021.01) |
| *G06F 21/31* | (2013.01) |
| *G06F 21/32* | (2013.01) |
| *G06F 21/45* | (2013.01) |
| *G06F 21/57* | (2013.01) |
| *G06F 40/284* | (2020.01) |
| *G06Q 40/02* | (2023.01) |
| *H04W 4/14* | (2009.01) |
| *H04W 12/062* | (2021.01) |
| *H04W 12/72* | (2021.01) |
| *H04W 60/00* | (2009.01) |

(56) References Cited

U.S. PATENT DOCUMENTS

| | | | | |
|---|---|---|---|---|
| 2005/0159921 | A1* | 7/2005 | Louviere | G06Q 30/02 |
| | | | | 702/181 |
| 2010/0100419 | A1* | 4/2010 | Natoli | G06Q 30/0202 |
| | | | | 705/7.31 |
| 2012/0158474 | A1* | 6/2012 | Fahner | G06Q 30/0211 |
| | | | | 705/14.13 |
| 2014/0114743 | A1* | 4/2014 | Fano | G06Q 30/0224 |
| | | | | 705/14.41 |
| 2016/0189202 | A1* | 6/2016 | Wang | G06Q 30/0243 |
| | | | | 705/14.42 |
| 2022/0051128 | A1* | 2/2022 | Ristoski | G06N 3/08 |
| 2022/0237226 | A1* | 7/2022 | McInerney | G06F 16/637 |
| 2023/0298028 | A1* | 9/2023 | Erdbrink | G06Q 20/382 |
| | | | | 705/37 |

OTHER PUBLICATIONS

Z. Zhao et al., "Uplift Modeling for Multiple Treatments with Cost Optimization," Mar. 26, 2020, arXiv:1908.05372v3, retrieved from: https://arxiv.org/pdf/1908.05372.pdf (Year: 2020).*

M. Bonvini et al., "Incremental causal effects: an introduction and review," Oct. 20, 2021, arXiv:2110.10532v1, retrieved from: https://arxiv.org/pdf/2110.10532 (Year: 2021).*

T. Lu et al. "Contextual Multi-Armed Bandits," 2010, Proceedings of 13th Int'l Conf on AI & Statistics (AISTATS) 2010, Chia Laguna Resort, Sardinia, Italy. vol. 9 of JMLR: W&CP 9, retrieved from: https://static.googleusercontent.com/media/research.google.com/en//pubs/archive/37042.pdf (Year: 2010).*

L. Li et al., "A Contextual-Bandit Approach to Personalized News Article Recommendation," 2010, arXiv:1003.0146v2, retrieved from: https://arxiv.org/pdf/1003.0146 (Year: 2010).*

* cited by examiner

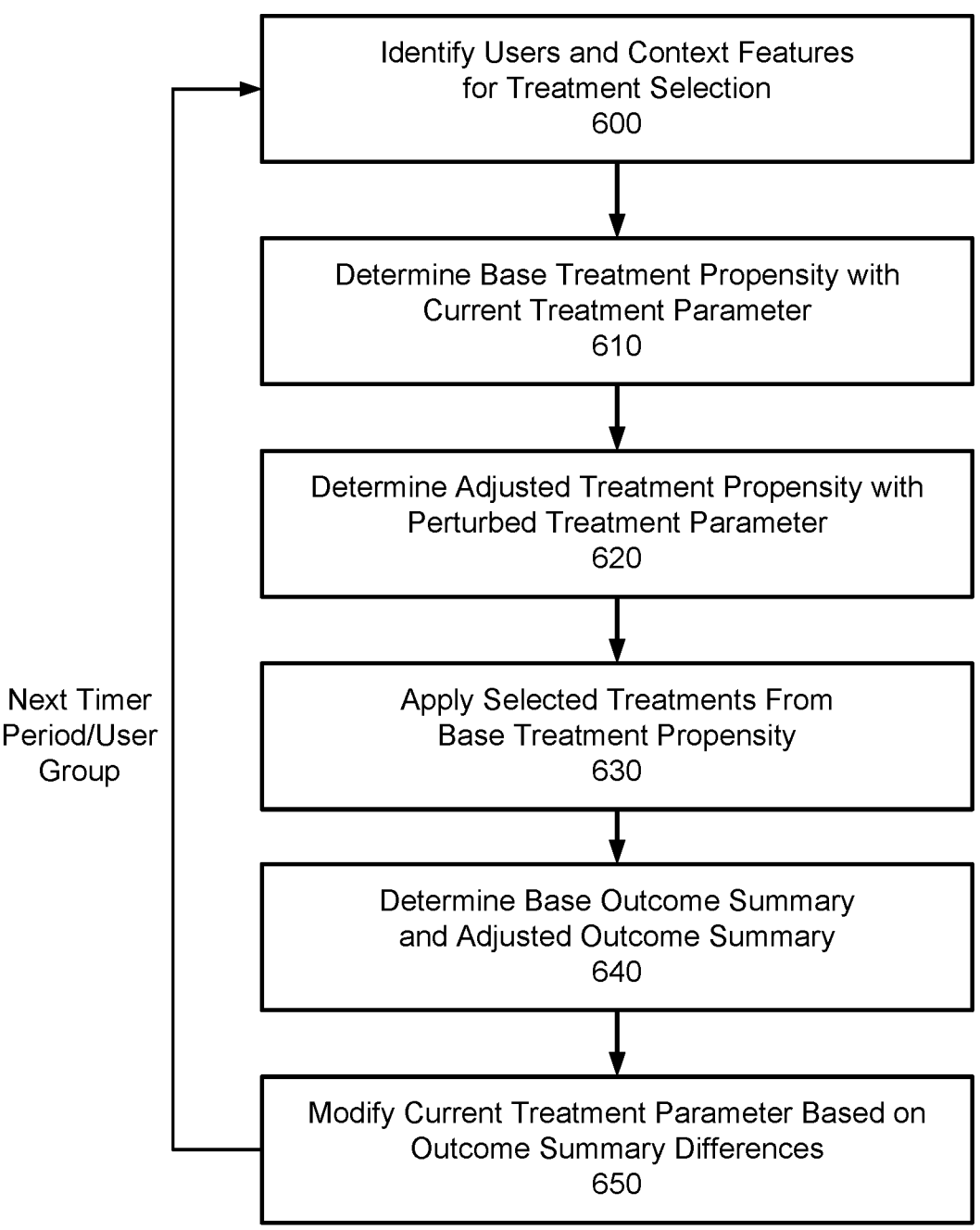

Identify Users and Context Features
for Treatment Selection
600

Determine Base Treatment Propensity with
Current Treatment Parameter
610

Determine Adjusted Treatment Propensity with
Perturbed Treatment Parameter
620

Apply Selected Treatments From
Base Treatment Propensity
630

Determine Base Outcome Summary
and Adjusted Outcome Summary
640

Modify Current Treatment Parameter Based on
Outcome Summary Differences
650

Next Timer
Period/User
Group

FIG. 6

PROPENSITY PERTURBATION FOR MODELED TREATMENT SELECTION

BACKGROUND

Designers of online systems often evaluate different feature options for a system by providing different treatments to different users in different contexts based on predictive models. For example, one treatment may represent a "current" or "standard" presentation of content or information to a user, or "no action." Another treatment may represent a modification of the interface or algorithm for selecting content, an offer to the user to increase user interaction or engagement with the system, and so forth. Likely user actions with respect to particular treatments (e.g., associated with various prospective rewards, values, or costs) may be predicted by one or more computer models that may require significant training data and training costs to develop. A treatment may then be determined for a user based on the treatment likely to best accomplish an overall objective.

However, these models may still not always select the optimal treatment during application to new users. For example, when the training data set behavior diverges from the data set on which the models are applied for further inference (i.e., in production for a practicing system), the selected treatments may not actually be the optimal way to maximize the overall objective. Further, as the users may be assigned a treatment based on the prediction, that divergence may be difficult to measure or correct without assigning users to a treatment that, at the time the treatment was assigned, was predicted by the current selection process not to be the optimal treatment. Further, when additional data is generated that can be used to improve the predictions, treatment assignment may not be correctable without incurring significant costs in re-training the predictive models.

SUMMARY

In accordance with one or more aspects of the disclosure, treatments are selected and applied based on a treatment parameter that may be modified to affect the frequency that treatments are selected for users. A perturbation of the treatment parameter may be used to evaluate counterfactual treatment assignments without requiring retraining of the underlying models. As such, rather than automatically selecting the treatment with the highest predicted objective (e.g., a value, reward, net benefit, etc.), a propensity (i.e., a likelihood) of receiving each treatment may be determined and represented as a propensity vector. The system may include computer models that predict one or more values or outcomes for the treatments, for example, describing a user's conditional likelihood of performing an action when receiving the treatment or the expected cost of providing the treatment to the user. The propensities for each treatment may be based on these model predictions. Users may be assigned to treatments based on the likelihoods of the propensity vector, such that users may be assigned to treatments other than the treatment predicted to have the highest performance, enabling the system to typically assign users to a preferred treatment and also collect further data for retraining the models and modifying the treatment parameter.

In one or more embodiments, treatments are selected for users based on a propensity vector determined based on a current value of the treatment parameter and determine the actual outcomes for users with the selected treatments. The perturbed value of the treatment parameter is used to determine an adjusted propensity vector for determining and evaluating the counterfactual scenario in which the treatment parameter has the changed value. The perturbed value is typically relatively close to the current value of the treatment parameter, such as within substantially 1, 2, 3, 5, or 10% of the current value, such that the results for the current value and the perturbed value may indicate an expected slope or rate of change of the overall goals of the system relative to the amount of perturbation. As the value of the treatment parameter directly affects the treatment propensities, the treatment parameter may then be modified for subsequent application, enabling modification of the treatment parameter to modify treatment propensities without requiring retraining of the underlying predictive models. As such, the treatment parameter can be changed between periods of retraining the models based on the counterfactual prediction with the perturbed value to improve model overall performance.

As one benefit, this approach allows performance in one time period (e.g., a previous time period) to be used to improve model performance in another time period (e.g., a future time period) by modifying the treatment parameter to affect the treatment allocation without having to retrain complex machine learning models. By providing the treatment parameter as a modifiable parameter for how the treatment allocations are selected, the application of the computer models may be refined in between training periods, and the retraining frequency may also be reduced, increasing model performance between training periods and reducing overall the computational costs, e.g., by reducing the frequency of retraining a complex model.

BRIEF DESCRIPTION OF THE DRAWINGS

FIG. 6 is a flowchart for a method of evaluating treatment propensity perturbation, in accordance with one or more embodiments.

DETAILED DESCRIPTION

Figure 1:
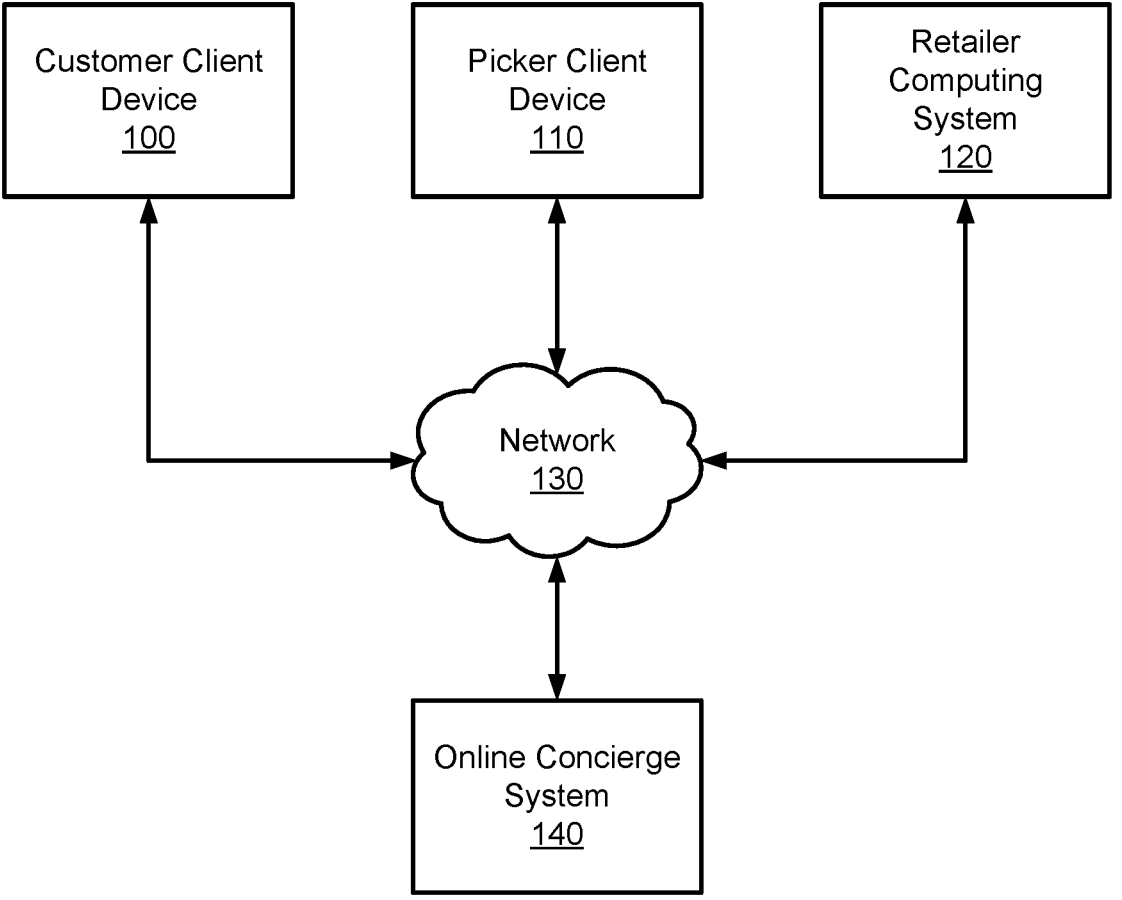
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As discussed further below, in one or more embodiments, the online concierge system 140 selects a treatment for a user of the online concierge system 140 from a plurality of treatments based on a propensity vector describing treatment propensities. The treatment propensities for the propensity vector may be determined based in part on one or more computer models that predict conditional user behavior given a particular treatment along with a modifiable treatment parameter that affects the treatment propensities. As such, although example treatments, computer models, and other components are generally discussed herein with respect to an online concierge system 140, embodiments of the invention include additional configurations in which different treatments are selected and applied. Additional details regarding the various treatments and selection thereof are further discussed with respect to FIGS. 2-6.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit (SKU) or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
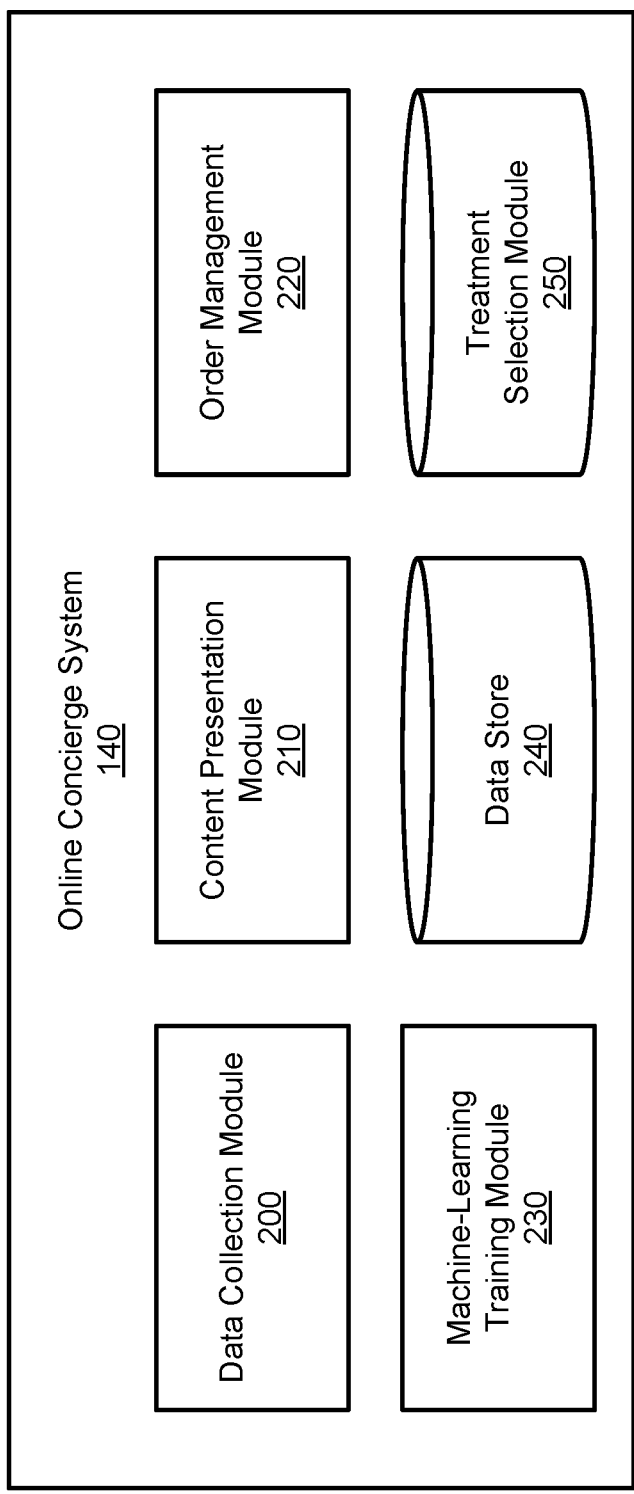
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, and a treatment selection module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location.

When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of the order. In some embodiments, the order management module 220 computes an estimated time of arrival of the picker to the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, hierarchical clustering, and neural networks. Additional examples also include perceptrons, multilayer perceptrons (MLP), convolutional neural networks, recurrent neural networks, sequence-to-sequence models, generative adversarial networks, and transformers. A machine-learning models may include components relating to these different general categories of model, which may be sequenced, layered, or otherwise combined in various configurations.

Each machine-learning model includes a set of parameters. The set of parameters for a machine-learning model are used to process an input and generate an output. For example, a set of parameters for a linear regression model may include weights that are applied to each input variable in the linear combination that comprises the linear regression model. Similarly, the set of parameters for a neural network may include the respective weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes a set of input data for which machine-learning model generates an output. For example, each training example may include customer data, picker data, item data, or order data. In some cases, the training examples also include a label which represents an expected output (i.e., a desired or intended output) of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model, whereby the machine-learning training module 230 updates parameters of the machine-learning model based on each of the set of training examples. The training examples may be processed together, individually, or in batches. To train a machine-learning model based on a training example, the machine-learning training module 230 applies the machine-learning model to the input data in the training example to generate an output with a current set of parameters. The machine-learning training module 230 scores the output from the machine-learning model using a loss function. A loss function is a function that generates a score for the output of the machine-learning model, such that the score is higher when the machine-learning model performs poorly and lower when the machine learning model performs well. In cases where the training example includes a label, the loss function is also based on the label for the training example. Example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory computer-readable media. The data store 240 uses computer-readable media to store data, and may use databases to organize the stored data.

The treatment selection module 250 selects a treatment for a user from a plurality of treatments. The particular characteristics of the treatments vary in different embodiments, and generally represent different ways in which the online concierge system 140 may interact with users. The treatments may represent, for example, different models or algorithms for selecting or presenting content to users, or may represent different services or offers made to users. In general, each treatment may be mutually exclusive with the other treatments and expected to provide different benefits (e.g., as measured with respect to an objective function) and/or incur different expected costs. These different treatments may thus be expected to causally affect user behaviors, e.g., resulting in actions that may benefit the objective. As treatments may be mutually exclusive, the treatment selection module 250 uses one or more computer models to generate predictive information about the treatments for a particular user and select a treatment to be applied to the user.

As one example, embodiments of the online concierge system 140 may include treatments that relate to incentives or other offers to provide to users to increase the likelihood that users place orders with the online concierge system 140. As such, one objective may be to increase the number of monthly active users interacting with the online concierge system 140 or whether a user subscribes to a premium service with the online concierge system 140. In other embodiments, the treatments may relate to algorithms or interfaces for presenting content, such as the number or quantity of sponsored content to present to a user in an interface, pricing algorithms, and other types of changed interactions with a user. In these examples, an objective may include, for example, the likelihood that a user places an order within a given time period (e.g., for monthly active users, an order within a month) or for a particular or service, and may also incur costs (e.g., a discount or coupon for a premium subscription, reduced fees for orders placed within a month, etc.).

One treatment may be a "control" or "no special action" such that other treatments may be considered variations of the "control" treatment. Thus, one example set of treatments may relate to offering a coupon discounting a premium service to a user. One treatment may be a "control" in which no coupon is offered, and another treatment may be adding a coupon offer having a specific value for the user (e.g., that may be presented during the user's interactions with the online system, such as during the user's order review and completion). As such, modeling for these actions may be complex and include predictions of user actions responsive to the treatment along with associated costs and/or benefits.

To select treatments and adjust the treatment selection, the treatments may be selected based on a propensity vector affected by a treatment parameter. As discussed below, the treatment selection based on the current value of the treatment parameter may be evaluated with respect to expected outcomes when the current value is perturbed by a relatively small amount, allowing the change in propensity vectors as a function of the treatment parameter and related outcomes to be evaluated in view of live operation of the system. The treatment selection module 250 determines the perturbed value of the treatment parameter based on the current value, for example, as a percentage or specific value increase or decrease to the current value of the treatment parameter.

The treatment selection module 250 may thus train and apply computer models in conjunction with the machine-learning training module 230 for selecting a treatment and also evaluate changes to the treatment parameter. The selected treatment may then be applied to users in conjunction with additional components in various embodiments and configurations. For example, treatments that affect content or offers provided to users may modify operation of the content presentation module 210, and information related to user responses may be collected by the data collection module 200 and stored in the data store 240.

Figure 3:
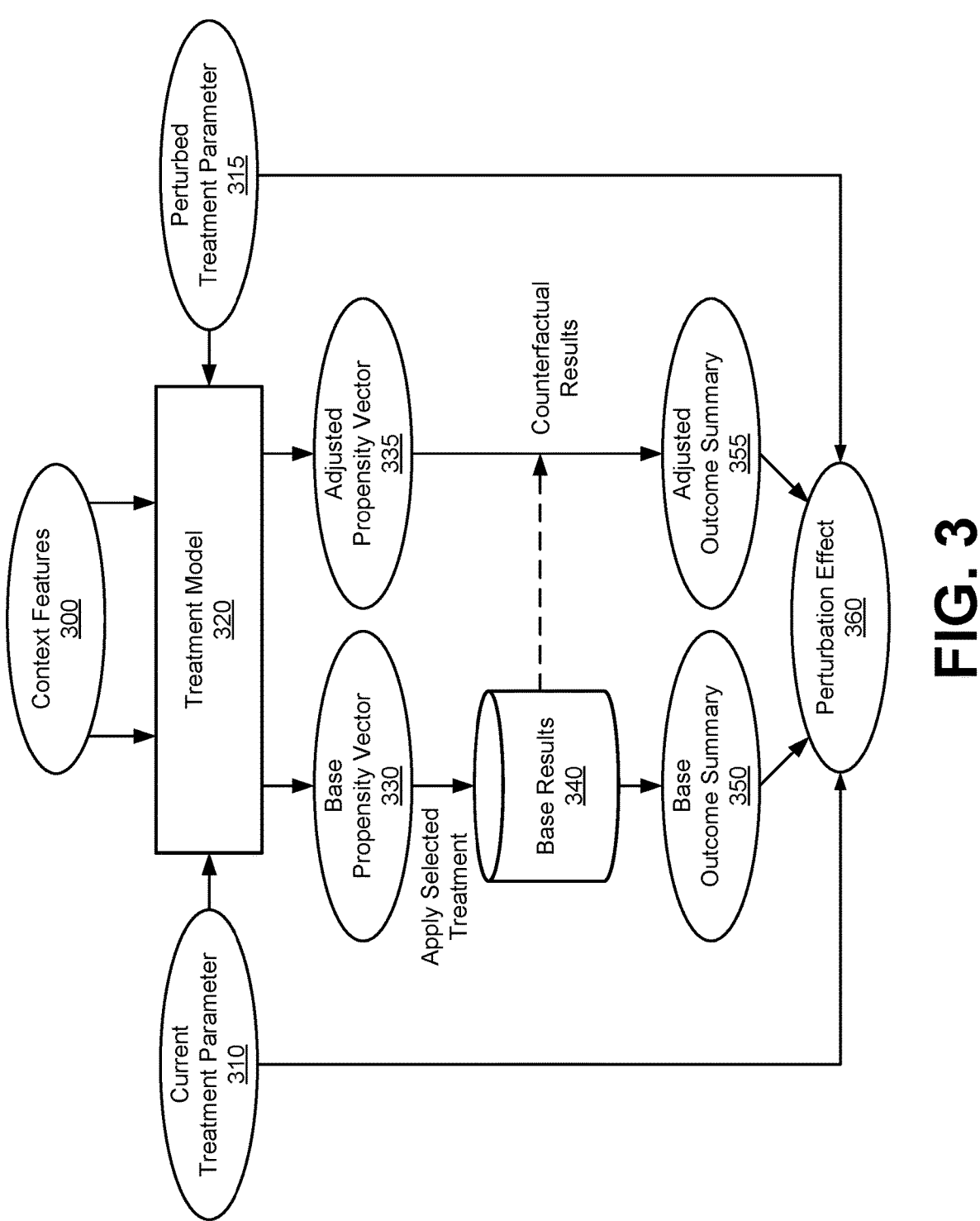
FIG. 3 shows an example data flow for determining a perturbation effect of a treatment parameter for a treatment model, in accordance with one or more embodiments.

FIG. 3 shows an example data flow for determining a perturbation effect of a treatment parameter for a treatment model 320, in accordance with one or more embodiments. The data flow shown in FIG. 3 may be performed and managed by the treatment selection module 250. When a treatment is to be assigned to a user, a set of context features 300 is determined for the user. A treatment may be selected for a particular user when the user accesses the online concierge system 140 (e.g., on demand) or may be predetermined for one or more users before the treatment is to be applied. Each user may be described with respect to a set of context features 300. The context features 300 may depend on the particular embodiment and implementation. In general, the context features 300 describe aspects of the user and/or the context in which the user uses or accesses the system that may affect the predicted outcome for selecting individual treatments. As such, different users, associated with different context features 300, may have different evaluations relative to the different treatments. In the examples below related to treatments for the online concierge system 140, the context features 300 may include features describing the user's interactions with the online concierge system 140, such as a user's location, previous orders, items purchased, order frequency, and average order value. For examples relating to a coupon offered to a user, such user features may also include prior coupon usage, membership history, and other features related to a particular treatment. In addition, in one or more embodiments, the different treatments may be assessed by the treatment model 320 with respect to different individual context features 300 and may be evaluated in different ways.

The treatment model 320 then applies the context features 300 in conjunction with a current treatment parameter 310 to determine a base propensity vector 330 for the user. Similarly, the context features 300 are applied with a perturbed treatment parameter 315 to determine an adjusted propensity vector 335. Each propensity vector describes a propensity (e.g., a frequency or likelihood) of applying each of the plurality of treatments. At this point, the treatments are evaluated prospectively as candidates for selection for a particular user and each treatment may be selected for a user in proportion to the treatment's propensity in the propensity vector. In general, the treatment propensities may prioritize treatments predicted to have the highest net outcome (e.g., predicted benefits less the predicted costs). As such, the treatment model 320 in various embodiments may include one or more computer models for evaluating the net outcome of the treatments and determining a propensity for each treatment based on the outcomes.

The treatment parameter may affect the treatment propensity vector in different ways in different embodiments. For example, the treatment parameter may affect how the net outcome is determined for a particular treatment, such as by affecting the rewards or costs of a particular treatment. As another example, the treatment parameter may affect the determination of treatment propensities based on the predicted treatment outcomes.

In one or more embodiments, the treatment model 320 models a "contextual bandit" problem, such that the treatment model 320 determines treatment propensities that balance maximizing allocation to a treatment having the highest expected "rewards" (i.e., net outcomes) in a given context (e.g., the particular context features 300) while also sampling (i.e., non-zero propensities) treatments currently-expected to have lower predicted "rewards" to continue to generate and collect data for updating (and correcting for) model error. As further discussed in FIGS. 4 and 5, the treatment model 320 selection may occur in two steps: first, determining predicted outcomes of the treatments, and second determining propensities for the treatments with consideration of the predicted outcomes.

The base propensity vector 330 is then used to select and apply a particular treatment for a user. As treatments are selected for users, the results of the selected treatments are selected and stored as a set of base results 340. The base results 340 may describe, for example, the user, the context features 300, the selected treatment, and the propensity of the selected treatment in the base propensity vector 330. In the example in which a treatment is a coupon for a premium tier of service for the online concierge system 140, the base results 340 may describe, for example, whether the user elected to sign up for the premium tier of service within a threshold amount of time after being presented with the coupon (e.g., whether the user used/redeemed the coupon).

The base results 340 may thus describe, for a population/group of users, the selected treatments, and the resulting outcomes for individual users. The base results 340 may then be summarized for the base propensity vector 330 according to metrics of interest as a base outcome summary 350. For example, an operator of the online concierge system may be interested in the total number of users who have signed up for a premium service or who placed an order within a time period, such as a month. The base outcome summary 350 for this example metric may describe, for example, the total number of premium users, or users ordering within the time period for users provided a treatment in the base results 340. In additional examples, the base outcome summary 350 may also include comparisons or other calculations based on the results. For example, the base outcome summary 350 may also indicate a net benefit (e.g., in a currency) or a ratio or other comparative value. As one example, the base outcome summary 350 may describe an average benefit/cost ratio for the applied treatments or other comparative evaluation of the results. As such, embodiments include other metrics of interest related to the desired outcome of the treatment selection for evaluation with respect to modification of the treatment parameter.

To evaluate the effect of a perturbed value of the treatment parameter (the perturbed treatment parameter 315), counterfactual results are estimated using the adjusted propensity vector 335. As one example, for a particular user, the base propensity vector 330 may assign a propensity for a particular treatment as a 60% likelihood of selection, whereas the adjusted propensity vector 335 may assign that respective treatment a 55% likelihood of selection. An adjusted outcome summary 355 may account for the different treatment propensities in the adjusted propensity vector 335. In one example, the base results 340 may be used to generate (e.g., estimate) the counterfactual results, for example, by predicting outcomes for each treatment and weighing the treatments according to the adjusted propensity vector 335. The outcomes for a treatment for a particular user may be estimated based on the base results 340 and/or as predictions from the treatment model 320. For example, in some embodiments, the outcome for a counterfactual treatment may be estimated for a user based on a similarity of the user to other users who received the counterfactual treatment in the base results 340. As such, the adjusted outcome summary 355 provides an estimate of the outcome summary when the perturbed treatment parameter 315 is used for selecting treatments and generates respective adjusted propensity vector 335 for users.

The base outcome summary 350 and adjusted outcome summary 355 are compared to determine a perturbation effect 360 that describes the expected change in overall outcome (i.e., the outcome summary across the group of users) for the treatment parameter when changed from the current value to the perturbed value. As such, rather than comparing the base results 340 to predictions for complete assignment of users entirely to one treatment or another, including the treatment parameter (as a component of the treatment model) enables fine-grained comparison of different propensity vectors based on the treatment parameter values. The change in the treatment parameter value compared to the change in outcome summary may thus be determined as a "slope" or rate-of-change of the outcome summary relative to the value of the treatment parameter at the current value of the treatment parameter. The different values of the treatment parameter and resulting outcomes may be presented to an operator of the system to evaluate modification of the current value. In some embodiments, the treatment parameter is automatically modified based on the change in outcome summary. When the perturbation effect 360 shows an improvement with the perturbed treatment value, the current value may be automatically modified towards the perturbed value, such as by setting the current value to the perturbed value or a portion of the difference between the current value and the perturbed value. In some embodiments, the current value is modified only when the perturbation effect 360 is sufficient and/or significant (e.g., higher than a threshold amount or percentage improvement). The modified current value may then be set as the current treatment parameter 310 and used to select treatments for another group of users.

Figure 4:
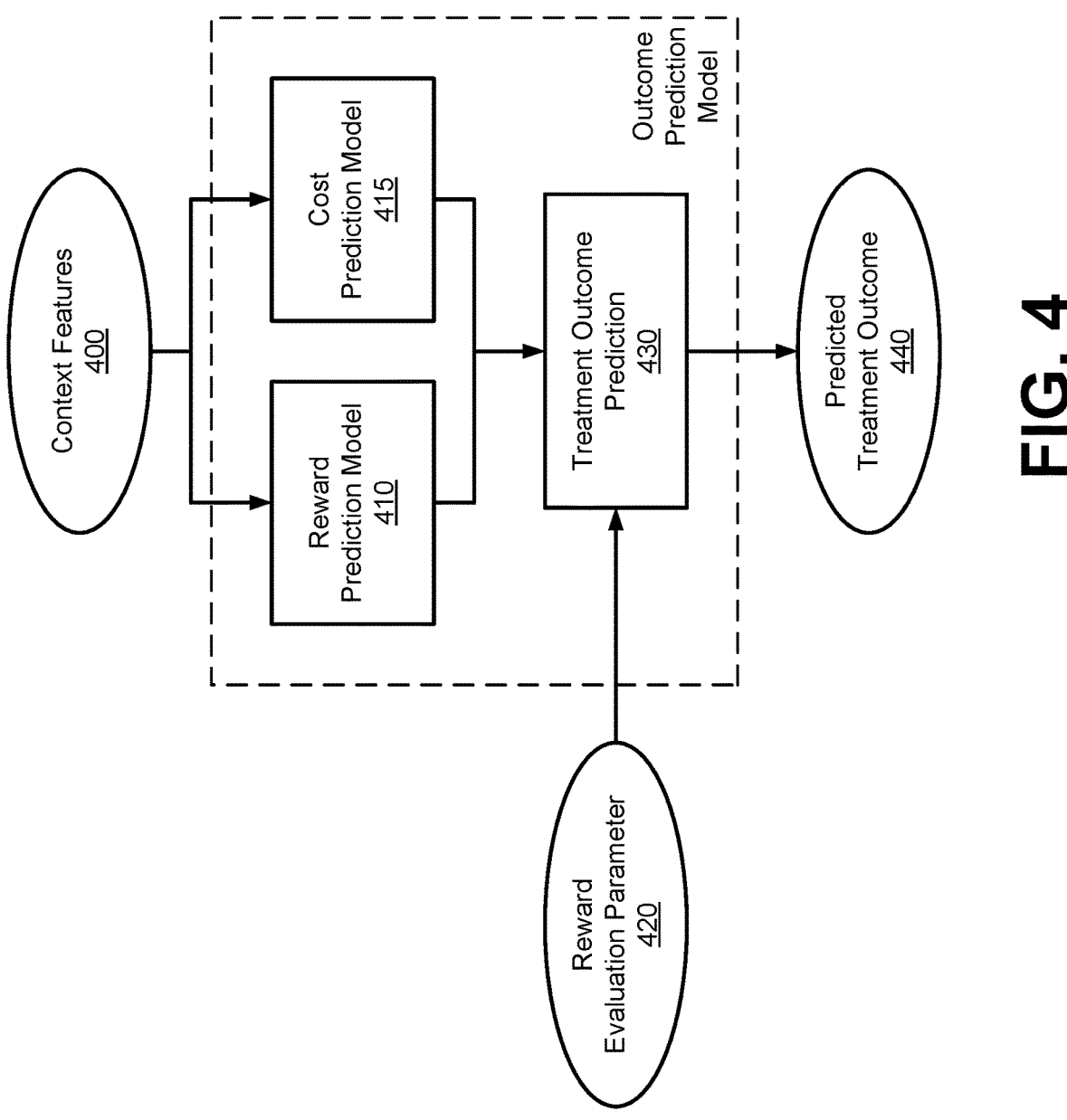
FIGS. 4 and 5 show example treatment parameters and components of a treatment selection model, in accordance with one or more embodiments.
Figure 5:
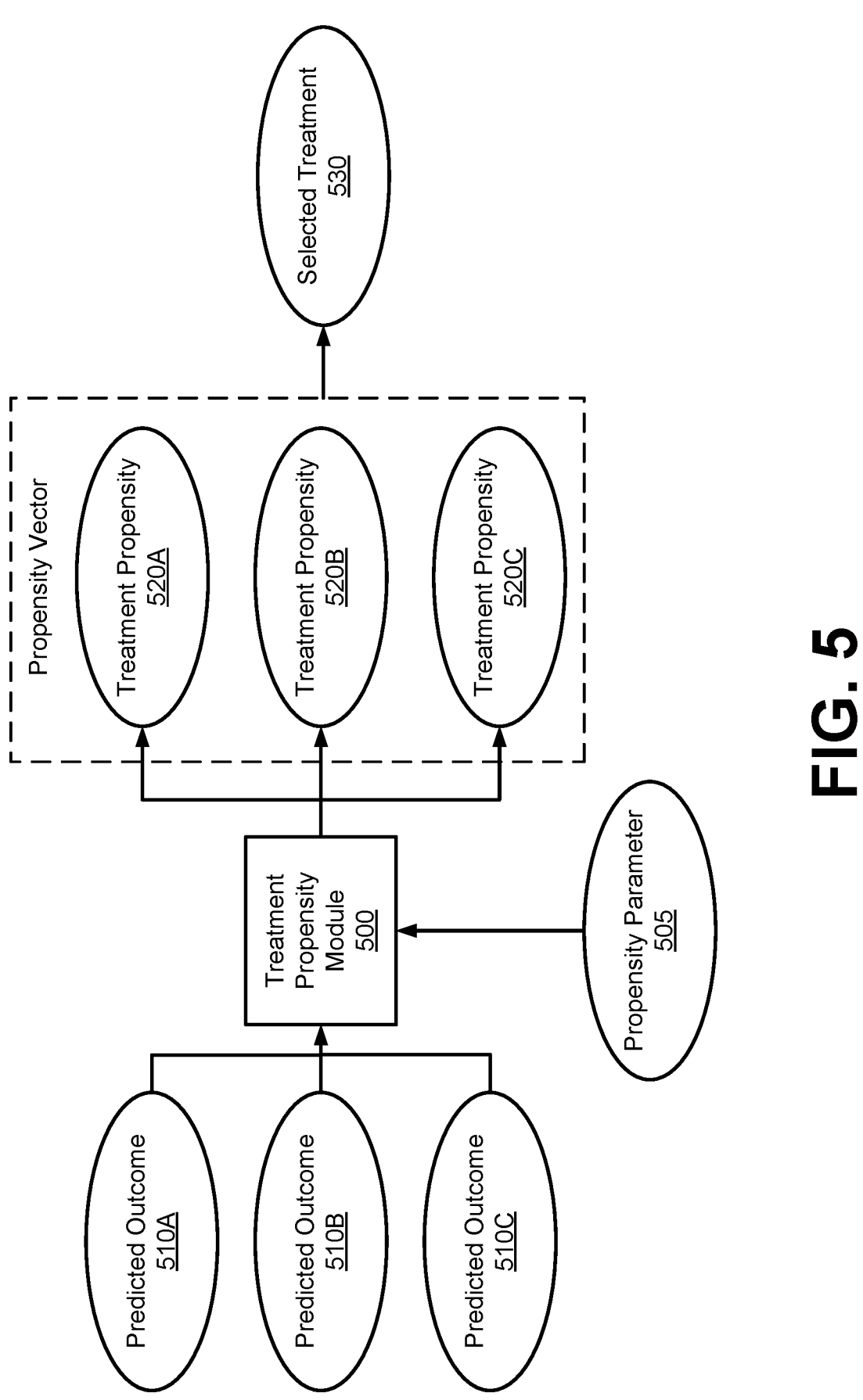

FIGS. 4 and 5 show example treatment parameters and components of a treatment selection model, according to one or more embodiments. FIG. 4 shows one or more embodiments in which an outcome prediction model generates a predicted treatment outcome 440. FIG. 5 shows one or more embodiments in which treatment propensities are determined based on treatment outcomes for particular treatments. In the example of FIG. 4, the treatment is evaluated for a set of context features 400 with respect to potential rewards and costs for the treatment. Depending on the configuration, each treatment may be evaluated with one or more computer models that may predict information related to the predicted treatment outcome 440. In some embodiments, aspects of the models may be shared across multiple treatments, such that the particular treatment to be evaluated may be an input to the model, or the model may include shared or joint layers with separate heads for prediction of information related to different treatments or different aspects of one treatment. In some embodiments, the treatments may also be associated with separate outcome prediction models, for example, when different treatments may be evaluated or predicted in different ways.

In the example of FIG. 4, rather than a single model that predicts an overall outcome, a reward prediction model 410 predicts information related to a reward (e.g., a benefit) of the treatment, and a cost prediction model 415 predicts information related to costs of the treatment. In this embodiment, the treatment parameter is a reward evaluation parameter 420 that affects how the reward and costs are combined in a treatment outcome prediction 430 to a predicted treatment outcome 440.

In some embodiments, rather than directly predicting a value of a reward or cost, the reward prediction model 410 and cost prediction model 415 predict a likelihood of user action. The reward evaluation parameter 420 may specify a value for the action, such that an expected value of the treatment may be the predicted likelihood of the action multiplied by the reward evaluation parameter 420. For example, the reward prediction model 410 may predict the likelihood that a user signs up for a premium service and the reward evaluation parameter 420 may indicate a value of a user sign-up. In some embodiments, the user actions and other rewards or costs may be evaluated as marginal likelihoods relative to a control treatment. When predicting the marginal likelihoods, the model may thus predict the expected "lift" of the treatment relative to the control treatment.

As one example, the reward prediction model 410 predicts a marginal likelihood of a user action, such as placing at least one order per month or signing up for a premium service. The reward evaluation parameter 420 specifies a value of a user performing that action, which may, for example, be based on financial analysis of historical users. The treatment outcome prediction 430 may combine the marginal likelihood of the user's action, multiply it by the reward evaluation parameter 420, and subtract predicted costs from the cost prediction model 415 to determine the predicted treatment outcome 440 of the treatment. The predicted treatment outcome 440 may thus represent an overall expected net benefit of the treatment. Additional embodiments include treatment parameters that may modify the predicted treatment outcome 440 based on the model predictions in other ways, for example, as a factor to increase or decrease the predicted treatment outcome 440 or otherwise affect evaluation of the treatment for a user.

The reward prediction model 410 and cost prediction model 415 may be relatively complex computer models that predict values based on the context features 400, such that training of these models may use significant computing resources and require significant training data. By including the treatment parameter as a reward evaluation parameter 420, the reward evaluation parameter 420 may be modified to generate different values for the predicted treatment outcome 440 without retraining or otherwise modifying these underlying predictive models. As the predicted treatment outcome 440 may be used to determine the treatment propensity for the treatment, adjustment of the reward evaluation parameter 420 may affect the likelihood that the treatment is selected. Similarly, different treatments may also have different modifiable treatment parameters, e.g., representing a different value to be used as rewards for different treatments.

FIG. 5 shows an example of generating a propensity vector based on predicted outcomes for a plurality of treatments, in accordance with one or more embodiments. In this example, a set of predicted outcomes 510A-C are generated for a group of treatments. The predicted outcomes may represent the expected net benefit of selecting a treatment in the context and as discussed above, may be determined in part by one or more computer models that predict user actions, which may include marginal likelihood of user action. In the example of FIG. 5, the treatment parameter is a propensity parameter 505 that affects the treatment propensity 520A-C for each treatment. The propensity parameter 505 is one example treatment parameter and may be used instead of or as an alternative to the reward evaluation parameter 420 shown in FIG. 4. As such, the propensity parameter 505 shown in FIG. 5 may be used in embodiments in which predicted outcomes 510A-C are determined with different model architectures or approaches than the example shown in FIG. 4.

A treatment propensity module 500 determines treatment propensities 520A-C based on respective treatments' predicted outcomes 510A-C. In some embodiments, the treatment propensity module 500 applies an epsilon-greedy algorithm or SoftMax layer to the predicted outcomes 510A-C. The propensity parameter 505 affects the extent to which the treatment associated with the highest-value predicted outcome 510 has a propensity approaching 100% and how the remaining propensity is distributed to the other treatments. The treatment propensity vector includes the treatment propensities 520A-C from which a selected treatment 530 is determined and applied to the user.

FIG. 6 is a flowchart for a method of evaluating treatment propensity perturbation, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., online concierge system 140). Additionally, each of these steps may be performed automatically by the online concierge system without human intervention.

Initially, a group of users is identified 600 for determining a treatment. The group of users may include users accessing the online concierge system or otherwise are assigned a treatment by the online concierge system. Treatments may also be assigned for systems other than online concierge systems, or treatments may be selected that are applied by a system external to the system performing treatment selection and propensity perturbation. For each of the users, a set of context features is also identified 600 to be used for treatment selection.

Using a current value of the treatment parameter, a base propensity vector is determined 610 for each user by applying a treatment model to the context features. A perturbed value of the treatment parameter is determined by modifying the current value of the treatment parameter as discussed above, and the corresponding adjusted treatment propensity is determined 620 with the perturbed value. Using the base treatment propensity for each user, a treatment is selected and applied 630 and results are obtained from the selected treatment. From the user treatment results, a base outcome summary and counterfactual adjusted outcome summary are determined 640. When the adjusted outcome summary predicts an improved outcome relative to the base outcome summary, this difference suggests the perturbed value of the treatment parameter may provide a higher overall benefit than the current value. The current value may then be modified 650 to improve the outcome for a subsequent group of users (e.g., in a next time period) as discussed above.

As such, including a treatment parameter in the treatment model as an input for generation of a treatment propensity enables the value of the treatment parameter to be readily modified and implement expected improvements to modeled outcomes without requiring retraining of the predictive models. In instances in which the models and a value of the treatment parameter are trained to optimize the outcomes, the application of the model to new users may nonetheless diverge from the expected benefit from the training. By evaluating the effect of the perturbation, the treatment parameter may be modified to optimize the application of the model in practice and enables optimization of the model performance of the existing model parameters. As one example application, the predictive models (i.e., as components of the overall treatment model) may be re-trained periodically, such as once a month. Within the period, the treatment parameter may be perturbed and modified as discussed herein to enable improved performance of the model as applied in practice between training instances.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example; comparing an output of the machine-learning model to the label associated with the training example; and updating weights associated for the machine-learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, at a computer system comprising a processor and a computer-readable medium, comprising:
   generating a base propensity vector of a plurality of treatments for each user of a group of users based on a current value of a treatment parameter and one or more computer models that predict user actions for one or more of the plurality of treatments based on a set of context features, wherein the one or more computer models include a machine learning model trained by:
      applying an iterative process to update model parameters based on a set of training examples including context features and labeled with user actions;
      determining a value of a loss function based on comparing predicted user actions to labeled user actions for the training examples; and
      updating the model parameters to reduce the value of the loss function;
   perturbing the treatment parameter by modifying the current value of the treatment parameter by an amount within a predetermined range to generate a perturbed value of the treatment parameter;
   generating an adjusted propensity vector for the plurality of treatments for each user of the group of users based on the perturbed value of the treatment parameter;

generating a base outcome summary describing results for the group of users with the current value of the treatment parameter based on application of a selected treatment to each user according to the user's base propensity vector;
   generating an adjusted outcome summary based on counterfactual application of a selected treatment to each user according to the user's adjusted propensity vector;
   modifying the current value of the treatment parameter based on the base outcome summary and the adjusted outcome summary to improve treatment allocation without retraining the machine learning model, thereby reducing computational resources and latency;
   generating a subsequent propensity vector for a user not included in the group of users based on the modified value of the treatment parameter applied with the one or more computer models; and
   providing a treatment to the user not included in the group of users based on the subsequent propensity vector.

2. The method of claim 1, wherein the treatment parameter specifies a value of the user action.

3. The method of claim 1, wherein the treatment parameter is a parameter for determining treatment propensity based on predicted treatment outcomes of the respective plurality of treatments.

4. The method of claim 1, wherein generating the subsequent propensity vector comprises using a contextual bandit model to generate the subsequent propensity vector.

5. The method of claim 1, wherein the computer model predicts a marginal likelihood of the user action.

6. The method of claim 1, wherein the one or more computer models predict a reward and a cost for the user action for one or more of the plurality of treatments.

7. The method of claim 1, wherein the one or more computer models are trained to predict user actions for one or more of the plurality of treatments based on one or more user features.

8. The method of claim 1, wherein the perturbed value of the treatment parameter is within substantially 10% of the current value of the treatment parameter.

9. A computer program product comprising a non-transitory computer readable storage medium having instructions encoded thereon that, when executed by a processor, cause the processor to perform steps comprising:
   generating a base propensity vector of a plurality of treatments for each user of a group of users based on a current value of a treatment parameter and one or more computer models that predict user actions for one or more of the plurality of treatments based on a set of context features, wherein the one or more computer models include a machine learning model trained by:
      applying an iterative process to update model parameters based on a set of training examples including context features and labeled with user actions;
      determining a value of a loss function based on comparing predicted user actions to labeled user actions for the training examples; and
      updating the model parameters to reduce the value of the loss function;
   perturbing the treatment parameter by modifying the current value of the treatment parameter by an amount within a predetermined range to generate a perturbed value of the treatment parameter;
   generating an adjusted propensity vector for the plurality of treatments for each user of the group of users based on the perturbed value of the treatment parameter;

generating a base outcome summary describing results for the group of users with the current value of the treatment parameter based on application of a selected treatment to each user according to the user's base propensity vector;

generating an adjusted outcome summary based on counterfactual application of a selected treatment to each user according to the user's adjusted propensity vector;

modifying the current value of the treatment parameter based on the base outcome summary and the adjusted outcome summary to improve treatment allocation without retraining the machine learning model, thereby reducing computational resources and latency;

generating a subsequent propensity vector for a user not included in the group of users based on the modified value of the treatment parameter applied with the one or more computer models; and providing a treatment to the user not included in the group of users based on the subsequent propensity vector.

10. The non-transitory computer readable medium storage of claim 9, wherein the treatment parameter specifies a value of the user action.

11. The non-transitory computer readable medium storage of claim 9, wherein the treatment parameter is a parameter for determining treatment propensity based on predicted treatment outcomes of the respective plurality of treatments.

12. The non-transitory computer readable medium storage of claim 9, wherein generating the subsequent propensity vector comprises using a contextual bandit model to generate the subsequent propensity vector.

13. The non-transitory computer readable medium storage of claim 9, wherein the computer model predicts a marginal likelihood of the user action.

14. The non-transitory computer readable medium storage of claim 9, wherein the one or more computer models predict a reward and a cost for the user action for one or more of the plurality of treatments.

15. The non-transitory computer readable medium storage of claim 9, wherein the set of context features includes one or more user features.

16. The non-transitory computer readable medium storage of claim 9, wherein the perturbed value of the treatment parameter is within substantially 10% of the current value of the treatment parameter.

17. A computer system, comprising:

a processor that executes instructions; and a non-transitory computer readable storage medium having instructions executable by the processor for:

generating a base propensity vector of a plurality of treatments for each user of a group of users based on a current value of a treatment parameter and one or more computer models that predict user actions for one or more of the plurality of treatments based on a set of context features, wherein the one or more computer models include a machine learning model trained by:

applying an iterative process to update model parameters based on a set of training examples including context features and labeled with user actions;

determining a value of a loss function based on comparing predicted user actions to labeled user actions for the training examples; and updating the model parameters to reduce the value of the loss function;

perturbing the treatment parameter by modifying the current value of the treatment parameter by an amount within a predetermined range to generate a perturbed value of the treatment parameter;

generating an adjusted propensity vector for the plurality of treatments for each user of the group of users based on the perturbed value of the treatment parameter;

generating a base outcome summary describing results for the group of users with the current value of the treatment parameter based on application of a selected treatment to each user according to the user's base propensity vector;

generating an adjusted outcome summary based on counterfactual application of a selected treatment to each user according to the user's adjusted propensity vector;

modifying the current value of the treatment parameter based on the base outcome summary and the adjusted outcome summary to improve treatment allocation without retraining the machine learning model, thereby reducing computational resources and latency;

generating a subsequent propensity vector for a user not included in the group of users based on the modified value of the treatment parameter applied with the one or more computer models; and providing a treatment to the user not included in the group of users based on the subsequent propensity vector.

18. The system of claim 17, wherein the treatment parameter specifies a value of the user action.

19. The system of claim 17, wherein the treatment parameter is a parameter for determining treatment propensity based on predicted treatment outcomes of the respective plurality of treatments.

20. The system of claim 17, wherein generating the subsequent propensity vector comprises using a contextual bandit model to generate the subsequent propensity vector.

* * * * *